United States Patent [19]

Tanibata

[11] Patent Number: 5,841,517
[45] Date of Patent: Nov. 24, 1998

[54] PRINTER SYSTEM FOR PRINTING COMBINED IMAGES ON A SAME PHOTOSENSITIVE SHEET

[75] Inventor: Tohru Tanibata, Wakayama, Japan

[73] Assignee: Noritsu Koki Co., Ltd., Wakayama, Japan

[21] Appl. No.: 512,402

[22] Filed: Aug. 8, 1995

Related U.S. Application Data

[63] Continuation-in-part of Ser. No. 100,998, Aug. 3, 1993, abandoned.

[51] Int. Cl.[6] ................................................. G03B 27/52
[52] U.S. Cl. ............................ 355/40; 396/311; 396/429
[58] Field of Search ...................... 354/75, 76, 106, 354/105; 355/39, 40, 71, 74; 396/311, 429

[56] References Cited

U.S. PATENT DOCUMENTS

| | | | |
|---|---|---|---|
| 4,568,180 | 2/1986 | Kogane | 355/74 |
| 4,634,268 | 1/1987 | Kogane | 355/74 |
| 4,712,909 | 12/1987 | Oshikoshi | 355/40 |
| 4,766,492 | 8/1988 | Miyawaki | 355/74 |
| 4,876,567 | 10/1989 | Yamaguchi et al. | 355/39 |
| 4,963,919 | 10/1990 | Mtsumoto et al. | 355/40 |
| 5,072,253 | 12/1991 | Patton | 355/40 |
| 5,128,711 | 7/1992 | Terashita et al. | 354/106 |
| 5,155,524 | 10/1992 | Oberhardt et al. | 355/68 |
| 5,166,510 | 11/1992 | Matsubara et al. | 358/75 |
| 5,199,081 | 3/1993 | Saito et al. | 382/2 |
| 5,285,247 | 2/1994 | Itoh | 355/282 |

Primary Examiner—Fred L. Braun
Attorney, Agent, or Firm—Wenderoth, Lind & Ponack

[57] ABSTRACT

An image printer includes a first exposure mechanism for exposing a photosensitive material to an original image projected from a medium such as a negative film, and a second exposure mechanism for exposing the same photosensitive material to a pattern image which is to be printed on the photosensitive material external an area in which the original image is printed by the first exposure mechanism. Attribute information is detected from the medium and a corresponding pattern image is determined. Masking plates are provided to mask a part of the photosensitive material from a projected illumination of the first exposure mechanism. The masked portion of the photosensitive material is an area in which the pattern image is printed by the second exposure mechanism.

24 Claims, 6 Drawing Sheets

PRINTER SYSTEM FOR PRINTING COMBINED IMAGES ON A SAME PHOTOSENSITIVE SHEET

CROSS REFERENCE TO RELATED APPLICATIONS

This is a Continuation-In-Part of application Ser. No. 08/100,998, filed Aug. 3, 1993, now abandoned.

BACKGROUND OF THE INVENTION

The present invention relates to a printer which combines images on a same photosensitive sheet.

Generally, one type of conventional image printer produces combination prints which contain photographic pictures and pattern images such as characters, and another type of conventional image printer prints pattern images outside original images using masking plates.

Figure 7:
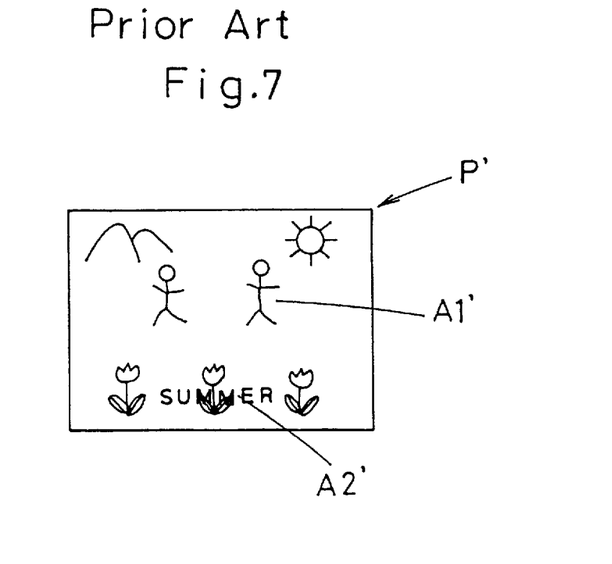
FIG. 7 is a plan view showing a combined image print in the image printer of the prior art.

In the former type of image printer, as shown in FIG. 7, a combined image print P' has a defective view in that an original image A1' and a pattern image A2' overlap each other. Further, in the latter type of image printer, the setting of masking plates conditions on a paper to be masked must be changed every time a pattern image to be printed is changed.

It is an object of the present invention, in view of the foregoing, to provide an image printer which automatically changes masking conditions in accordance with changes of image patterns to be combined, and which automatically prints a complete addition image within a masked area of an original print.

SUMMARY OF THE INVENTION

An image printer according to the present invention comprises an exposure means exposing the photosensitive material to an original image projected from a negative film; an attribute information detecting means detecting an attribute data e.g. a shooting date or a message, from the negative film; a pattern determining means determining a pattern of e.g. characters, symbols, or markings, to be printed which represent the attribute data detected by the attribute information detecting means; a pattern exposure controlling means controlling an exposure of a pattern from the attribute data of said pattern determining means; a pattern exposure means for exposing the photosensitive material by said pattern exposure controlling means; a vertical position detecting means detecting vertical position data denoting upward and downward orientation of the original image within the frame of the negative film; and a vertical position determining means determining the orientation of the original image from the vertical position data of the vertical position detecting means. Further, the image printer comprises masking plates masking a part of an illumination from said exposure means to thereby mask an area in which said pattern image is to be printed outside an original image; a masking plate driving means changing the masking conditions of said masking plates according to a position and area of said pattern image; and a controller estimating a printing direction of said pattern image, masking positions and masking area of said masking plates from the vertical position data of the vertical position determining means, said controller controlling the masking plates driving means in accordance with the estimation.

In another aspect of the invention, the controller of the image printer automatically determines the masking condition of said masking plates in accordance with the area of said pattern image and controls said masking plate driving means in accordance with the determined masking condition.

In still another aspect of the invention, the image printer further comprises an input means which inputs and sets up said pattern image during exposure of the photosensitive material to the original image.

In a further aspect of the invention, the image printer further comprises an input means which inputs and sets up exposing colors of said pattern images during exposure of the photosensitive material to the original image.

In another aspect of the invention, the pattern image exposure means of the image printer performs a line exposure on the photosensitive material during running by a PLZT head of linear shape extending at a right angle to the pass line of the photosensitive material.

In still another aspect of the invention, the pattern image exposure means of the image printer is composed of an exposure device using a CRT.

In the operation of the image printer of the present invention, a masking position and masking area of the masking plates are estimated from the vertical position data of the vertical position determining means and from the detected attribute data, and the masking plates are moved by controlling the masking plate driving means in accordance with the estimation. Therefore, the masking position and the masking area on the original image are automatically changed in accordance with changes of image patterns such as characters to be combined.

DETAILED DESCRIPTION OF THE PREFERRED EMBODIMENT

A preferred embodiment of the present invention will be described in the form of an image printer referring to the accompanying drawings.

Figure 1:
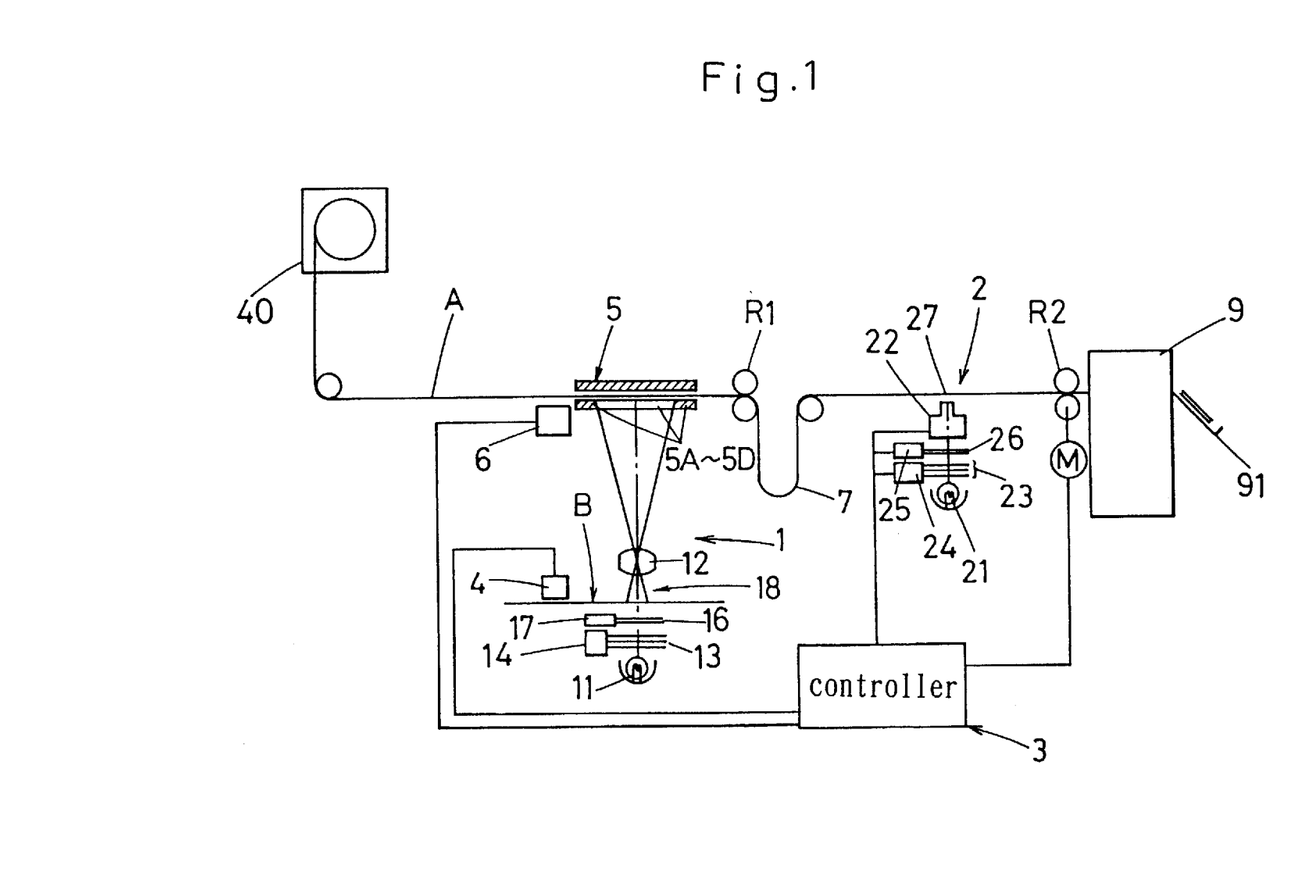
FIG. 1 is a schematic view of an image printer according to the present invention.

FIG. 1 shows a schematic view of the image printer in which an exposure means 1 and a pattern exposure means 2 are arranged across the pass line along which a photosensitive material A of long tape shape is transferred.

The photosensitive material A is unloaded from a magazine 40 where it is installed in a roll and transferred by the action of a transfer roller unit R1.

A loop station 7 is arranged between the exposure means and the pattern exposure means 2 where the photosensitive material A runs in a loop after being exposed to an original image A1 for projection printing at the exposure means 1.

The exposure means 1 comprises a light source 11, a lens 12 which reflects an image of a negative film, a light modulation filter unit 13 arranged across the light path between the light source 11 and the negative film B for advancing into and retracting from the light path, a light modulation filter driving means 14 for controlling the movement of the light modulation filter unit 13, a mechanical shutter 16 arranged for mechanically closing the light path between the light source 11 and the light modulation filter unit 13 in response to a command signal from a controller 3 (e.g. a computer system) described later in order to pass a desired tone of light, and a mechanical shutter driving mechanism 17. In operation, the photosensitive material A halted at a paper mask portion 5 is exposed to a photographic image A1 which is projected from the negative film B by illumination of the light source 11.

The paper mask portion 5 comprises four masking plates 5A, 5B, 5C and 5D placed around an image exposure portion of the photosensitive material A, and a masking plate driving means operating the four masking plates separately by receiving command signals sent from a controller 3 as described below.

The masking plates 5C, 5D are arranged to move along a transferring direction of the photosensitive material A and the masking plates 5A, 5B are arranged to move in a direction at a right angle to a transferring direction of the photosensitive material A.

The pattern exposure means 2 comprises a light source 21, a PLZT head 22 of linear shape extending at a right angle to the pass line of the photosensitive material A, a light modulation filter unit 23, a light modulation filter driving means 24 for actuating the light modulation filter unit 23 to advance to and retract from the light path between the light source 21 and the PLZT head 22, a mechanical shutter 26 arranged for mechanically closing the light path between the light source 21 and the PLZT head 22, and a mechanical shutter driving mechanism 25. The PLZT head 22 is arranged to receive light from the light source 21 through the light modulation filter unit 23. Accordingly, the pattern exposure means 2 allows the transferring photosensitive material A to be line exposed to an additional image A2, e.g. a message or relevant information of characters and symbols, with a variation of color.

The PLZT head 22 comprises layers of an analyzer, a PLZT crystal, and a polarizer, in which the analyzer is covered with a selfoc lens-eye.

The pattern exposing means 2 may be an exposure device using a CRT.

Also, denoted by reference numeral 4 is a vertical position and attribute data detecting means for reading a vertical position data denoting an orientation of the original image within the image frame in upward and downward directions and an attribute data C, e.g. a shooting date ("1995.8.1") or a message ("SUMMER VACATION"), from the negative film B and sending them as electric signals to the controller 3.

Figure 8:
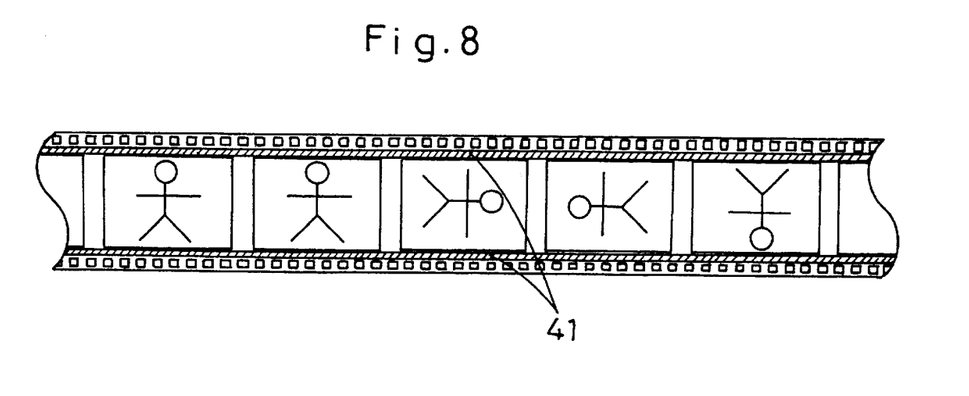
FIG. 8 illustrates magnetic recording strips contained on a film negative for magnetically recording attribute data and vertical position data.

More particularly, as illustrated in FIG. 8, the attribute data and the vertical position data are magnetically recorded on the film negative by magnetic recording strips 40. The vertical position and attribute data detecting means 4 is a sensor for reading the data from the magnetic recording strips 40.

Figure 2:
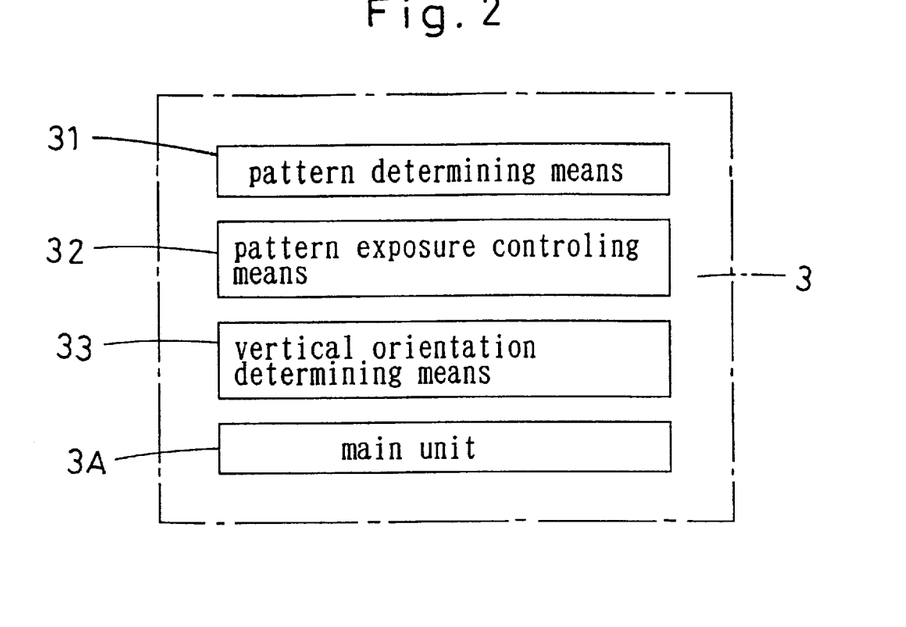
FIG. 2 is a block diagram of a controller in the image printer of the present invention.
Figure 3:
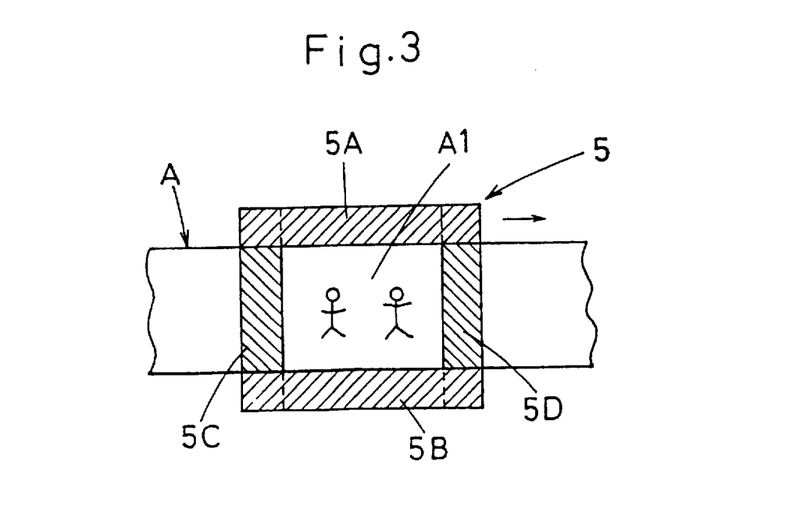
FIGS. 3 and 4 are plan views showing a movement of a masking plate on a paper mask in the image printer of the present invention.

As shown in FIG. 2, the controller 3 contains a pattern determining means 31, a pattern exposure controlling means 32, and vertical position determining means 33 accompanied with a main unit 3A.

The pattern determining means 31 determines a pattern of the additional image A2, e.g. characters, symbols, or markings, to be printed to the photosensitive material A in accordance with the attribute data read out by the vertical position and attribute data detecting means 4. The pattern exposure controller means 32 instructs the pattern exposure means 2 to perform an exposure of the additional image A2 at optimum conditions determined by the pattern determining means 31. The vertical position determining means 33 determines the vertical orientation of the original image A1 from the vertical position data magnetically recorded on the negative film B and detected by the vertical position and attribute data detecting means 4.

The main unit 3A of the controller 3 estimates and determines a printing direction of the additional image A2 and a masking position and masking area of the masking plates 5A, 5B, 5C and 5D from the vertical position data of the vertical position detecting means 33 and the pattern determined by the pattern examining means 31. Then, the main unit 3A sends command signals to the masking plate driving means 6.

The printing action of the image printer of the present invention will now be explained.

The vertical position data and the attribute data, e.g. a shooting data and/or a message, recorded on the negative film B are read with the vertical position and attribute data detecting means 4 and fed as an electric signal to the controller 3.

Figure 4:
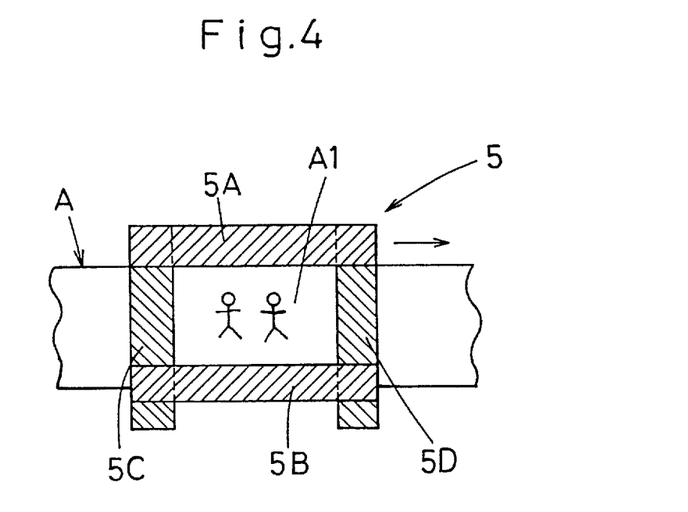

While the negative film B is driven to the projection station 18, the photosensitive material A is unloaded from a magazine 40 and transferred to the exposure means 1, and the original image A1 is exposed to the photosensitive material A. The masking plate driving means 6 is controlled by the controller 3 to drive the masking plates 5A, 5B, 5C and 5D of the paper mask 5 to mask a part of the illumination light from the exposure means 1. That is, the masking plates 5A, 5B, 5C and 5D mask the printing portion of the additional image A2. In FIG. 4, the masking plate 5B masks the lower portion of the image portion.

In this way, the additional image A2 is printed outside the original image A1.

The photosensitive material A in which the original image A1 has been printed is transferred to the pattern exposure means 2. In the pattern exposure means 2, the additional image A2 is line exposed with an exposure color indicated by command signals sent from the controller 3 on the masked portion of the photosensitive material A during transferring.

The combined image print P is developed in a photographic processing department 9 and cut into pieces by a cutter and the pieces are sent into a tray 91.

Figure 6:
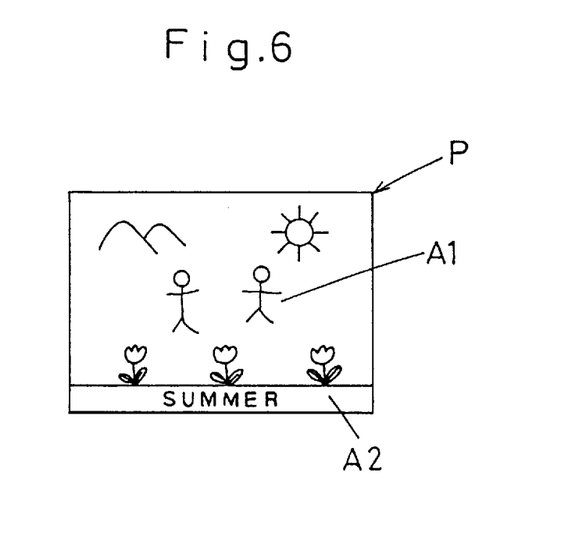
FIG. 6 is a plan view showing a combined image print in the image printer of the present invention.

FIG. 6 shows that a combined image print P on which the lower portion of A1 has been masked and the additional image A2 such as characters has been printed on the masked portion. In this way, the original image A1 and the additional image A2 are separately printed on the photosensitive material A.

Figure 5:
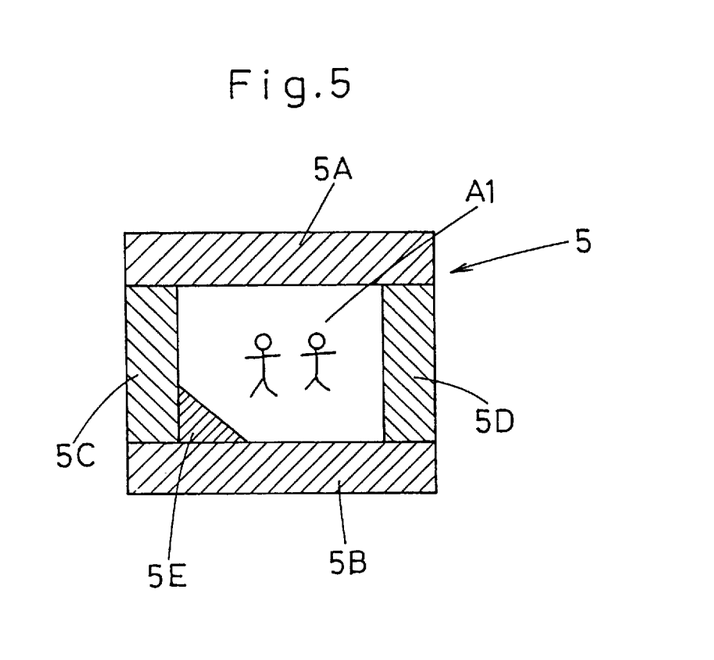
FIG. 5 is a plan view showing another application of a paper mask in the image printer of the present invention.

FIG. 5 shows another application of a paper mask 5 in which a corner masking plate 5E is added. The movement of the corner masking plate 5E is controlled by the masking plate driving means 6 independently from masking plates 5A, 5B, 5C and 5D. The corner masking plate 5E can be moved in any direction on the image printing portion. By employing the corner masking plate 5E, the original image A1 needs only a small masking portion in the corner.

It is needless to say that the number, the position and the moving direction of the masking plates are changeable according to a desirable product.

Although this embodiment employs the negative film B as a recording medium for printing information on the photosensitive material, other mediums such as positive films or transparencies may be used with equal success.

For a better understanding of the invention, reference is made to the remaining FIGS. 9–12.

Figure 9:
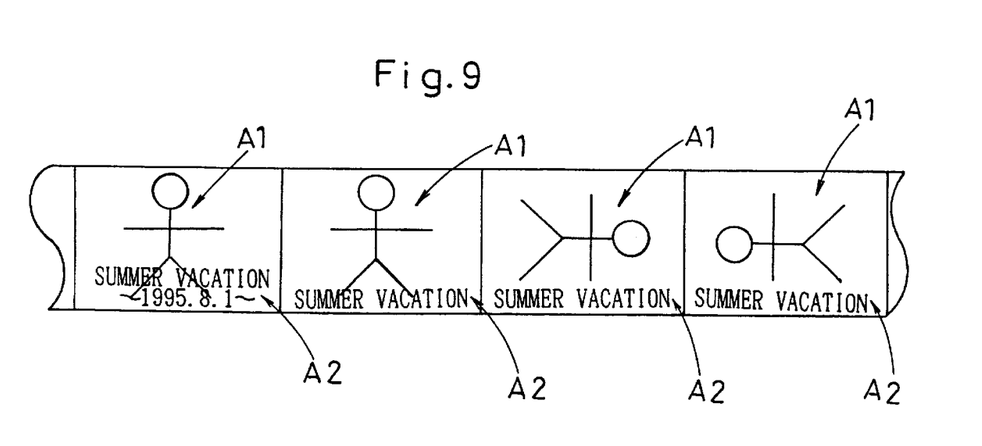
FIG. 9 illustrates an example of print frames in a case where vertical position data is not used, masking plates are not used, and there is no recognition of masking area.

FIGS. 9 depicts a situation in which an original image A1 is combined with an additional image A2 without using the vertical position data, without using a masking plate, and without recognition of a necessary masking area. In the first two frames, since the masking plate is not used, the additional image A2 overlaps the original image A1. In the third and fourth frames, since the vertical position data is not used, the additional image A2 is positioned at a right angle relative to the original image A1. Of course, none of these images is desirable.

Figure 10:
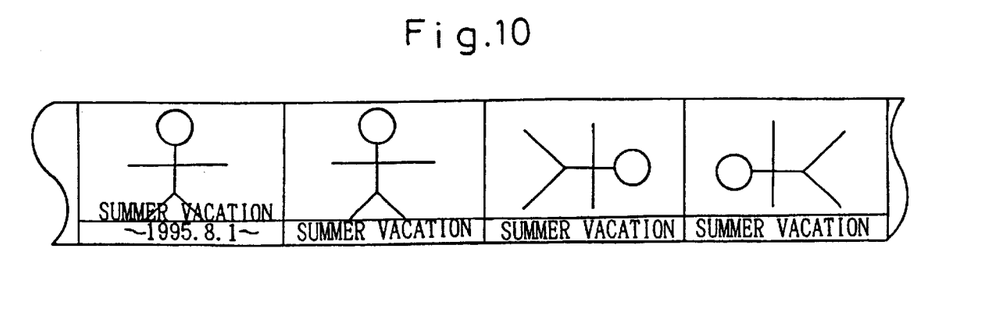
FIG. 10 illustrates an example of print frames in a case where vertical position data is not used, a masking plate is used, and there is no recognition of masking area.

FIGS. 10 is similar to FIG. 9, except that the masking plate is used. As shown in the second frame, the additional image A2 does not overlap the original image A1, since a portion of the original image A1 was masked. However, as can be seen in the first frame, since there is no recognition of a necessary masking area, a portion of the additional image A2 overlaps the original image A1, since an insufficient portion of the original image A1 was masked.

Figure 11:
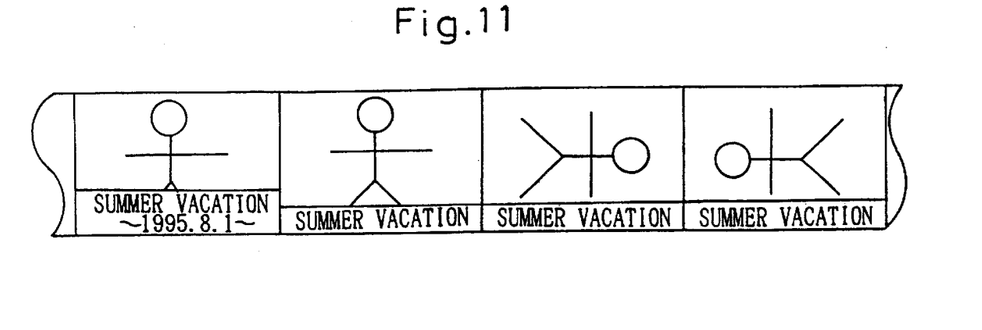
FIG. 11 illustrates an example of print frames in a case where the vertical position data is not used, a masking plate is used and there is recognition of a masking area.

FIG. 11 is similar to FIG. 10, except that a necessary masking area is recognized. Thus, as shown in the first frame, the entire additional image A2 does not overlap the original image A1, since the masked area of the original image A1 is of a sufficient size.

Figure 12:
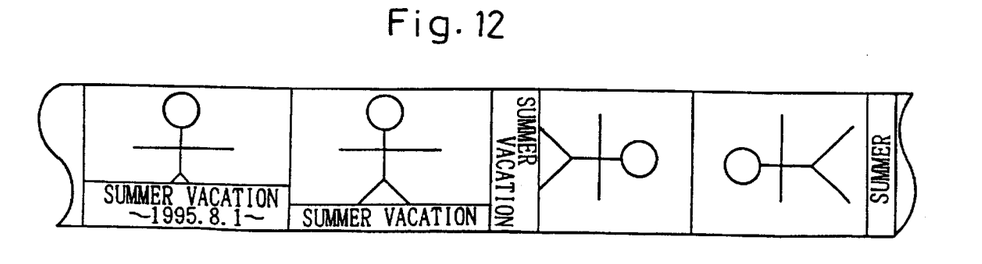
FIG. 12 illustrates an example of print frames according to the present invention in which the vertical position data is used, the masking plates are used, and there is recognition of a masking area.

Finally, FIG. 12 illustrates the features of the present invention in which the vertical position data is used, and the masking plate and recognition of necessary masking area are also used. As shown in the third and fourth frames, since the vertical position data is used, the additional image A2 is oriented to coincide with the orientation of the original image A1. Also, as shown in each of the frames, masking of a sufficient area has been carried out.

What is claimed is:

1. An image printer comprising:

an exposure means for exposing a photosensitive material to an original image projected from a medium, an attribute information detecting means for detecting an attribute data from the medium, a pattern determining means for determining a pattern image to be printed in accordance with the attribute data detected by the attribute information detecting means, a pattern exposure controlling means for controlling an exposure of the pattern image determined by said pattern determining means, a pattern exposure means for exposing the photosensitive material to the pattern image determined by the pattern determining means, a vertical orientation data detecting means for detecting vertical orientation data indicative of an upward and downward orientation of the original image within an image plane from the medium, a vertical orientation determining means for determining the upward and downward orientation of the original image within the image plane on the photosensitive material from the vertical orientation data detected by the vertical orientation detecting means, adjustable masking plates completely masking a part of the photosensitive material from a projected illumination of said exposure means, said part of the photosensitive material being a portion in which the pattern image is to be printed on the photosensitive material external an area in which the original image is printed by said exposure means, a masking plate driving means for changing a masking position and a masking area of said masking plates according to a position and area of said pattern image, and a controller for estimating a printing direction of said pattern image and the masking position and masking area of said masking plates from the upward and downward orientation determined by the vertical orientation determining means, and for controlling said masking plates driving means in accordance with a thus obtained estimation.

2. An image printer as claimed in claim 1, wherein said controller automatically estimates the masking position and masking area of said masking plates in accordance with an area of said pattern image and controls said masking plates driving means in accordance with the estimation.

3. An image printer as claimed in claim 2, further comprising:

an input means for inputting and setting up said pattern image during exposure of the photosensitive material to the original image.

4. An image printer as claimed in claim 3, further comprising:

an input means for inputting and setting up exposing colors of said pattern image during exposure of the photosensitive material to the original image.

5. An image printer as claimed in claim 4, wherein the pattern image exposure means includes means for performing a line exposure on the photosensitive material using a PLZT head of linear shape extending at a right angle to a pass line of the photosensitive material.

6. An image printer as claimed in claim 4, wherein the pattern exposure means is an exposure device using a CRT.

7. An image printer as claimed in claim 3, wherein the pattern image exposure means includes means for performing a line exposure on the photosensitive material using a PLZT head of linear shape extending at a right angle to a pass line of the photosensitive material.

8. An image printer as claimed in claim 3, wherein the pattern exposure means is an exposure device using a CRT.

9. An image printer as claimed in claim 2, further comprising:

an input means for inputting and setting up exposing colors of said pattern image during exposure of the photosensitive material to the original image.

10. An image printer as claimed in claim 9, wherein the pattern image exposure means includes means for performing a line exposure on the photosensitive material using a PLZT head of linear shape extending at a right angle to a pass line of the photosensitive material.

11. An image printer as claimed in claim 9, wherein the pattern exposure means is an exposure device using a CRT.

12. An image printer as claimed in claim 2, wherein the pattern image exposure means includes means for performing a line exposure on the photosensitive material using a PLZT head of linear shape extending at a right angle to a pass line of the photosensitive material.

13. An image printer as claimed in claim 2, wherein the pattern exposure means is an exposure device using a CRT.

14. An image printer as claimed in claim 1, further comprising:
    an input means for inputting and setting up said pattern image during exposure of the photosensitive material to the original image.

15. An image printer as claimed in claim 14, further comprising:
    an input means for inputting and setting up exposing colors of said pattern image during exposure of the photosensitive material to the original image.

16. An image printer as claimed in claim 15, wherein the pattern image exposure means includes means for performing a line exposure on the photosensitive material using a PLZT head of linear shape extending at a right angle to a pass line of the photosensitive material.

17. An image printer as claimed in claim 15, wherein the pattern exposure means is an exposure device using a CRT.

18. An image printer as claimed in claim 14, wherein the pattern image exposure means includes means for performing a line exposure on the photosensitive material using a PLZT head of linear shape extending at a right angle to a pass line of the photosensitive material.

19. An image printer as claimed in claim 14, wherein the pattern exposure means is an exposure device using a CRT.

20. An image printer as claimed in claim 1, further comprising:
    an input means for inputting and setting up exposing colors of said pattern image during exposure of the photosensitive material to the original image.

21. An image printer as claimed in claim 20, wherein the pattern image exposure means includes means for performing a line exposure on the photosensitive material using a PLZT head of linear shape extending at a right angle to a pass line of the photosensitive material.

22. An image printer as claimed in claim 20, wherein the pattern exposure means is an exposure device using a CRT.

23. An image printer as claimed in claim 1, wherein the pattern image exposure means includes means for performing a line exposure on the photosensitive material using a PLZT head of linear shape extending at a right angle to a pass line of the photosensitive material.

24. An image printer as claimed in claim 1, wherein the pattern exposure means is an exposure device using a CRT.

* * * * *